United States Patent
Kim

(10) Patent No.: US 11,325,655 B2
(45) Date of Patent: May 10, 2022

(54) BODY STRUCTURE OF ECO-FRIENDLY VEHICLE FOR SUPPORTING BATTERY

(71) Applicants: HYUNDAI MOTOR COMPANY, Seoul (KR); KIA MOTORS CORPORATION, Seoul (KR)

(72) Inventor: Hyung Tae Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 99 days.

(21) Appl. No.: 16/992,320

(22) Filed: Aug. 13, 2020

(65) Prior Publication Data

US 2021/0061369 A1 Mar. 4, 2021

(30) Foreign Application Priority Data

Sep. 3, 2019 (KR) .................. 10-2019-0108560

(51) Int. Cl.
| | |
|---|---|
| *B60J 7/00* | (2006.01) |
| *B62D 25/20* | (2006.01) |
| *B60K 1/04* | (2019.01) |
| *B62D 21/15* | (2006.01) |

(52) U.S. Cl.
CPC .............. *B62D 25/20* (2013.01); *B60K 1/04* (2013.01); *B62D 21/157* (2013.01); *B60K 2001/0416* (2013.01)

(58) Field of Classification Search
CPC .... A61P 35/00; A61K 38/00; H04W 72/0446; Y02E 60/10; G06N 3/08; G06Q 40/04; E04F 15/04; E04F 15/02; E04F 2201/0153; E04F 2201/0115
See application file for complete search history.

(56) References Cited

U.S. PATENT DOCUMENTS

| | | | |
|---|---|---|---|
| 8,393,426 B2 | 3/2013 | Takahashi et al. | |
| 2013/0075173 A1* | 3/2013 | Kato .................. | H01M 50/20 180/68.5 |
| 2015/0174996 A1* | 6/2015 | Ikeda ................. | B60K 1/04 180/68.5 |
| 2016/0114699 A1* | 4/2016 | Hokazono .......... | B60K 1/04 180/68.5 |
| 2017/0182874 A1* | 6/2017 | Shimasaki ......... | H01M 50/20 |
| 2017/0217296 A1* | 8/2017 | Nomura ............. | B60R 19/02 |
| 2017/0305248 A1* | 10/2017 | Hara .................. | B60K 1/04 |
| 2017/0305251 A1* | 10/2017 | Hara .................. | H01M 50/20 |

* cited by examiner

*Primary Examiner* — Kiran B Patel
(74) *Attorney, Agent, or Firm* — Morgan, Lewis & Bockius LLP

(57) ABSTRACT

The present disclosure is to provide a body structure of an eco-friendly vehicle for supporting a battery including an intermediate floor panel composed of a first intermediate floor panel connected to a center floor panel and a second intermediate floor panel connected to a rear floor panel; a rear cross reinforcement panel and an extension reinforcement member mounted on a bottom portion in a battery seating area of the intermediate floor panel; and an intermediate floor upper panel mounted on a front portion in the battery seating area of the intermediate floor panel.

12 Claims, 8 Drawing Sheets

A-A cross section

B-B cross section

BODY STRUCTURE OF ECO-FRIENDLY VEHICLE FOR SUPPORTING BATTERY

CROSS-REFERENCE TO RELATED APPLICATION

This application claims under 35 U.S.C. § 119(a) the benefit of priority to Korean Patent Application No. 10-2019-0108560 filed on Sep. 3, 2019, the entire contents of which are incorporated herein by reference.

TECHNICAL FIELD

The present disclosure relates to a body structure of an eco-friendly vehicle for supporting a battery, and more particularly, to a body structure of an eco-friendly vehicle for supporting a battery, in which an intermediate floor portion mounted with a battery in a body area of the eco-friendly vehicle has an improved structure in which stiffness reinforcement and watertight are possible.

BACKGROUND

An eco-friendly vehicle, such as a hybrid vehicle or an electric vehicle, is mounted with a high-voltage battery which discharges and supplies a power to a drive motor and which is charged with a power generated through regenerative braking of the motor.

Mostly, a battery is mounted on an intermediate floor panel of the body structure of the eco-friendly vehicle located below a rear seat.

For reference, the intermediate floor panel is a portion of the body structure that connects a center floor panel and a rear floor panel with each other, and it is a panel having a step height in order to mount the rear seat.

In order to endure the heavy weight of the high-voltage battery and to achieve a firm mount of the high-voltage battery at the same time, a separate reinforcement for the intermediate floor panel is necessary.

For this, as an example of the related art as illustrated in FIGS. 1 and 2, an intermediate floor panel 10 and first and second reinforcement panels 11 and 12 having areas enough to cover their surrounding areas are provided, and a reinforcement structure is applied to attach the first and second reinforcement panels 11 and 12 to the intermediate floor panel 10, respectively.

More specifically, the structure is applied so that the first reinforcement panel 11 is attached to a rear surface of the intermediate floor panel 10, the second reinforcement panel 12 is attached to a front surface of the intermediate floor panel 10, and both side end portions of the second reinforcement panel 12 are connected to a rear side member 20 of the body.

However, the summed area of the first and second reinforcement panels 11 and 12 in the related art is set to be excessively larger than the area that can actually support the battery, and this causes the body weight to be increased. Further, the first and second reinforcement panels 11 and 12 in the related art merely serve to reinforce the intermediate floor panel 10, but they have the drawback that the support stiffness of a portion, on which a heavy-weight battery 30 is actually seated, of the area of the first and second reinforcement panels 11 and 12 is relatively weak.

Further, because the first reinforcement panel 11 of the related art is connected to an upper portion of the rear side member 20, and both side end portions of the second reinforcement panel 12 are connected to a front end portion of the rear side member 20 of the vehicle body, the interior of the rear side member 20 is hidden by the both side end portions of the first and second reinforcement panels 11 and 12 to form a closed cross section. Accordingly, it is not possible to apply a sealer inside the rear side member 20, and thus water may permeate into the rear side member 20 to cause corrosion to occur therein.

As another example of the related art, U.S. Pat. No. 8,393,426 discloses a body structure of a hybrid vehicle, in which a battery is simply mounted on a rear cross member and a center cross member that form a straight array in the left and right directions as seen from the above using a leg type bracket, and thus the battery support stiffness is remarkably degraded.

The above information disclosed in this background section is only for enhancement of understanding of the background and therefore it may contain information that does not form the prior art that is already known in this country to a person of ordinary skill in the art.

SUMMARY OF THE DISCLOSURE

The present disclosure is proposed for solving the above problems, and the object of the present disclosure is to provide a body structure of an eco-friendly vehicle for supporting a battery, in which an intermediate floor portion of the body structure mounted with the battery has improved support stiffness and collision stiffness, so that light weight can be realized in comparison with the existing structure, and watertight for a rear side member can be realized.

In one aspect of the present disclosure for achieving the above object, a body structure of an eco-friendly vehicle for supporting a battery includes an intermediate floor panel composed of a first intermediate floor panel connected to a center floor panel and a second intermediate floor panel connected to a rear floor panel; a rear cross reinforcement panel and an extension reinforcement member mounted on a bottom surface of a battery seating area of the intermediate floor panel; and an intermediate floor upper panel mounted on a front portion of the battery seating area of the intermediate floor panel.

Preferably, the rear cross reinforcement panel and the extension reinforcement member are arranged to support a bottom portion of the second intermediate floor panel.

More preferably, the rear cross reinforcement panel is arranged in a width direction of a vehicle body as both end portions of the rear cross reinforcement panel are connected to rear side members of the vehicle body, and an upper portion of the rear cross reinforcement panel is bonded to a bottom portion on a rear side of the second intermediate floor panel.

Further, two or more extension reinforcement members are arranged in a width direction of a vehicle body, each of the two or more extension reinforcement members extends in a length direction of the vehicle body, and rear end portions of the extension reinforcement members are connected to the rear cross reinforcement panel and front end portions of the extension reinforcement members are arranged to extend up to a bottom portion of the first intermediate floor panel.

Further, the intermediate floor upper panel has a vertically bent cross-sectional shape, and a vertical front end portion of the intermediate floor upper panel is connected onto the first intermediate floor panel and a horizontal rear end portion of the intermediate floor upper panel is connected onto the second intermediate floor panel.

Preferably, a plurality of reinforcement bulkheads are further mounted on an inner wall of the intermediate floor upper panel.

Preferably, corner positions of the intermediate floor upper panel include a plurality of band fastening holes for fixing the battery.

Accordingly, if the battery is seated on the battery seating area of the intermediate floor panel, a battery weight is supported by the rear cross reinforcement panel, the extension reinforcement member, and the intermediate floor upper panel.

That is, the rear cross reinforcement panel and the extension reinforcement member support the battery weight by supporting a bottom surface of the second intermediate floor panel of the intermediate floor panel, and the intermediate floor upper panel supports the battery weight by directly supporting a bottom portion on a front side of the battery.

Preferably, an upper portion of the rear side member has an open structure for sealer application.

Further, a first side reinforcement member is mounted on an interior of the rear side member to keep side portion stiffness and to secure side collision stiffness.

Furthermore, two or more second side reinforcement members are further mounted to be spaced apart from each other along a width direction of a vehicle body for reinforcing side collision stiffness at positions of a bottom portion of the first intermediate floor panel of the intermediate floor panel.

Through the above means, the present disclosure provides the following effects.

First, because the rear cross reinforcement panel, the extension reinforcement member, the intermediate floor upper panel, and so on are mounted only on the regions of the intermediate floor panel area on which a battery is actually supported, the battery weight can be easily supported, and the light weight can be realized in comparison with the existing weight.

Second, because the first side reinforcement member and the second side reinforcement member are mounted on the interior of the rear side member and on the position of the bottom portion of the intermediate floor panel, a stiffness increasing effect that is strong against side collision can be provided.

Third, because the rear side member is formed to have the open structure, a waterproof sealer can be easily applied in the rear side member, and the watertight effect for blocking water permeation can be obtained.

Other aspects and preferred embodiments of the present disclosure are discussed infra.

It is understood that the term "vehicle" or "vehicular" or other similar terms as used herein is inclusive of motor vehicles in general such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinafter by way of illustration only, and thus are not limitative of the present disclosure, and wherein.

Figure 1:
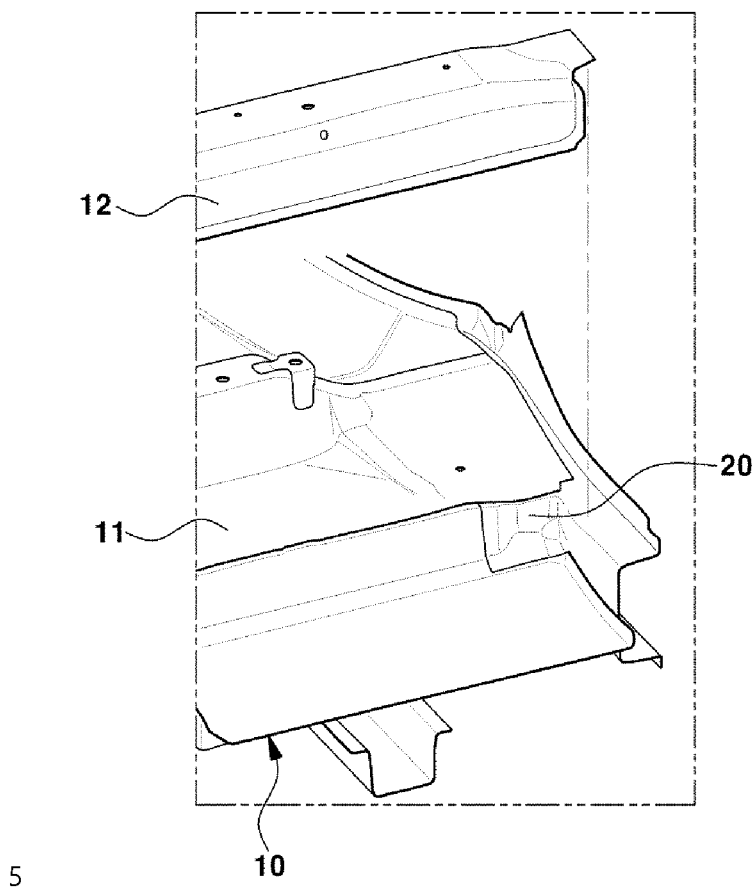
FIG. 1 is a perspective view illustrating an example in which first and second reinforcement panels for supporting a battery are mounted on an intermediate floor panel in the related art.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the present disclosure will be described in conjunction with exemplary embodiments, it will be understood that present description is not intended to limit the present disclosure to those exemplary embodiments. On the contrary, the present disclosure is intended to cover not only the exemplary embodiments, but also various alternatives, modifications, equivalents and other embodiments, which may be included within the spirit and scope of the present disclosure as defined by the appended claims.

The term "comprises" and/or "comprising" used in the whole description means that one or more other components, steps, operations and/or elements are not excluded but added to the described components, steps, operation and/or elements.

Hereinafter, a preferable embodiment of the present disclosure will be described in detail with reference to the accompanying drawings.

Figure 3:
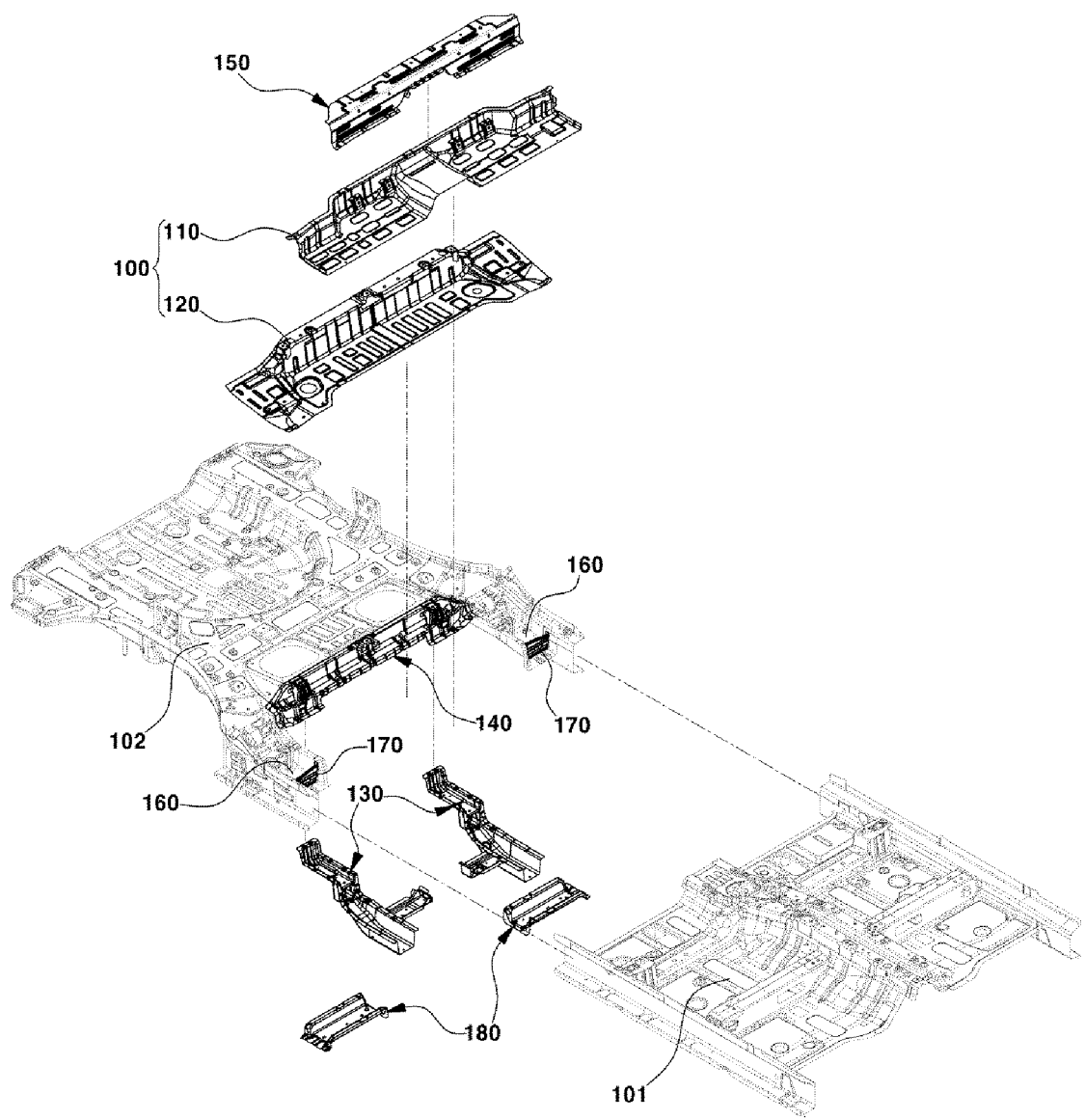
FIGS. 3 and 4 are exploded perspective views illustrating a body structure for supporting a battery of an eco-friendly vehicle according to the present disclosure.
Figure 4:
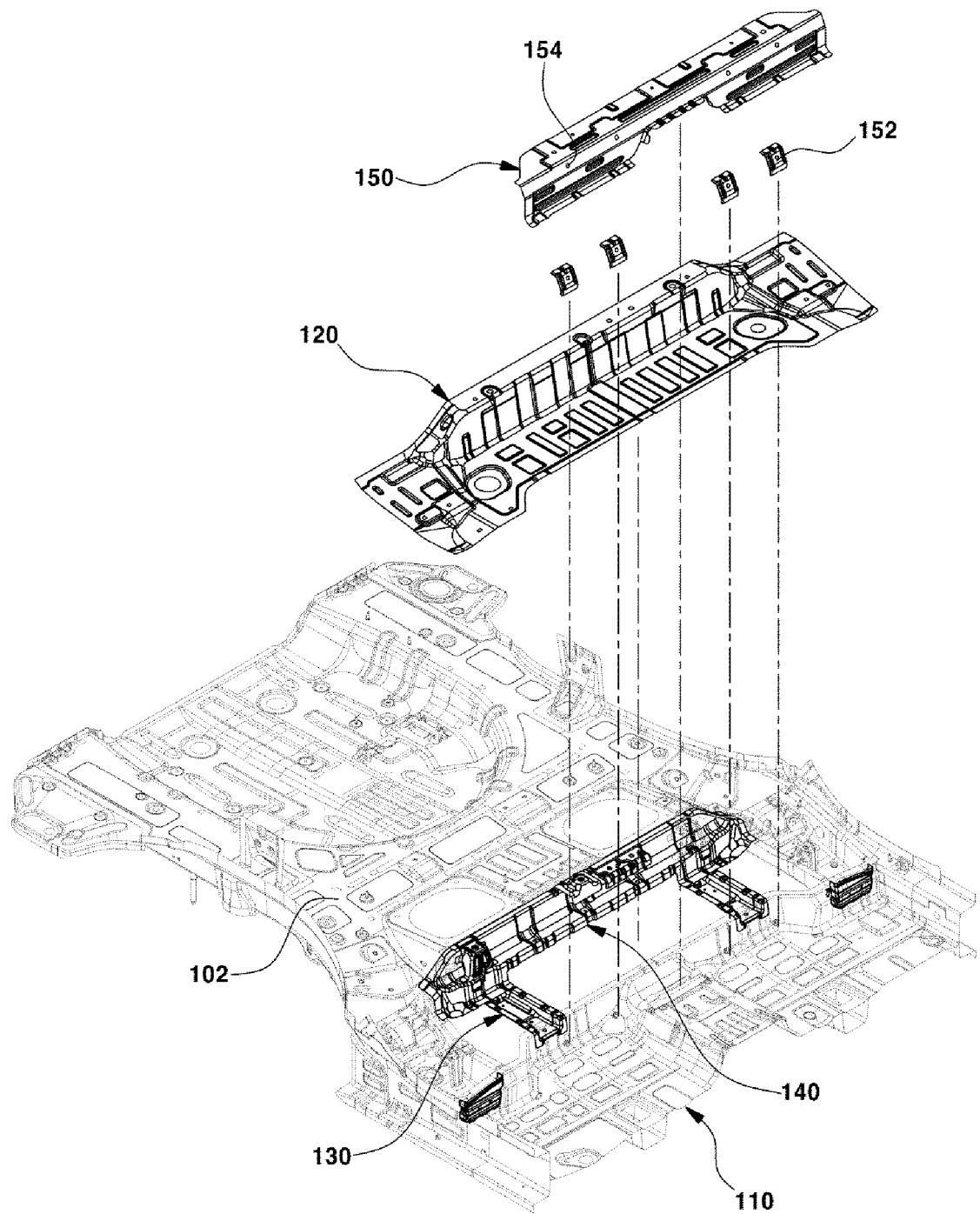

FIGS. 3 and 4 are perspective views illustrating a body reinforcement device of an eco-friendly vehicle according to the present disclosure. In the respective drawings, a drawing reference numeral 100 denotes an intermediate floor panel.

The intermediate floor panel 100 is a portion of a body structure of an eco-friendly vehicle that connects a center floor panel 101 and a rear floor panel 102 with each other. The intermediate floor panel 100 is located below a rear seat, and it is used as an area on which a battery is mounted.

Preferably, the intermediate floor panel 100 is divided into a first intermediate floor panel 110 arranged on a front side and connected to the center floor panel 101 and a second intermediate floor panel 120 arranged on a rear side and connected to the rear floor panel 102.

In this case, a front end portion of the first intermediate floor panel 110 is in a horizontal state and a rear end portion of the first intermediate floor panel 110 is in a vertical state. As seen from the above, the first intermediate floor panel 110 is not simply in a straight shape in left and right directions, but the vertical portion thereof has a structure that is further concavely formed in rearward direction in order to secure an internal installation space of a reinforcement bulkhead 152 to be described later.

The second intermediate floor panel 120 and the first intermediate floor panel 110 are integrally formed by welding or the like in a state where the rear end portion of the vertical portion of the first intermediate floor panel 110 is put on the front end portion of the second intermediate floor panel 120 to overlap each other, and thus the first intermediate floor panel 110 and the second intermediate floor panel 120 constitute the single intermediate floor panel 100.

In this case, the second intermediate floor panel 120 that is an area on which a battery of the intermediate floor panel 100 is seated requires separate reinforcement in consideration of the battery weight.

For this, on a bottom portion of the second intermediate floor panel 120, a rear cross reinforcement panel 140 and two or more extension reinforcement members 130, preferably, a pair of extension reinforcement members 130 are mounted.

With reference to FIGS. 3 and 4, the rear cross reinforcement panel 140 is connected to the rear floor panel 102 by welding or the like, and the pair of extension reinforcement members 130 are arranged in a width direction of a vehicle body in a state where rear end portions of the extension reinforcement members 130 are connected to the rear cross reinforcement panel 140 and front end portions of the extension reinforcement members 130 are arranged to extend up to a bottom portion of the first intermediate floor panel 120. Each of the extension reinforcement members 130 extends in a length direction of the vehicle body.

Because the second intermediate floor panel 120 is seated and mounted on the rear cross reinforcement panel 140 and the extension reinforcement members 130, the rear cross reinforcement panel 140 and the extension reinforcement members 130 serve to support and reinforce the second intermediate floor panel 120.

Further, an intermediate floor upper panel 150 is mounted, for the purpose of increasing the stiffness of supporting the battery, on a step height portion, which is the battery seating area, where the first intermediate floor panel 110 and the second intermediate floor panel 120 are integrated.

The intermediate floor upper panel 150 has a vertically bent cross-sectional shape, and a vertical front end portion of the intermediate floor upper panel 150 is connected onto the first intermediate floor panel 110 and a horizontal rear end portion of the intermediate floor upper panel 150 is connected onto the second intermediate floor panel 120.

In this case, considering that the intermediate floor upper panel 150 is also a portion on which the battery weight acts, a plurality of reinforcement bulkheads 152 are further mounted inside the intermediate floor upper panel 150 so as to increase bending and torsional stiffness of the intermediate floor upper panel 150.

Figure 8:
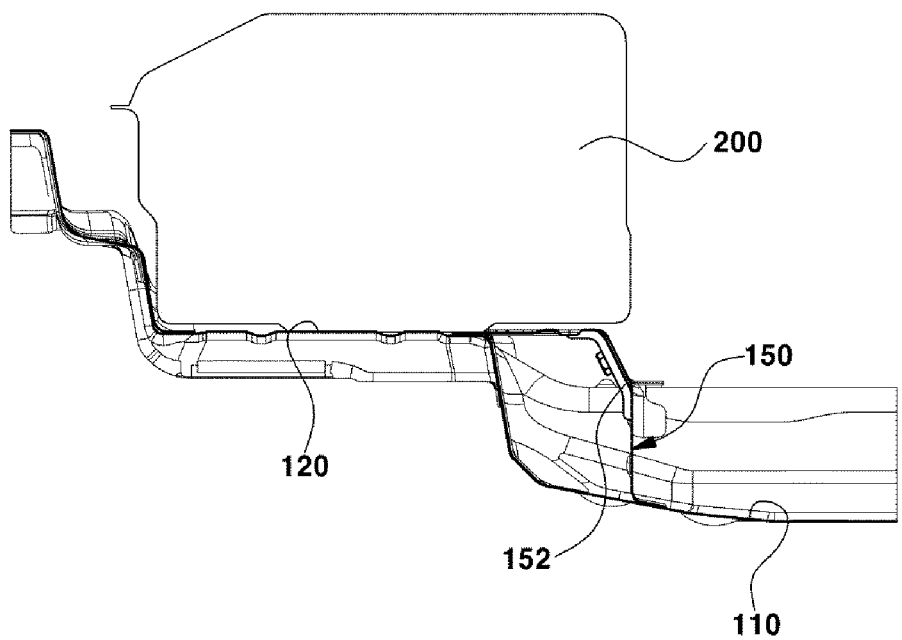
FIGS. 8 and 9 are cross-sectional views taken along lines A-A and B-B of FIG. 7, respectively.

More specifically, as shown in FIGS. 3 and 4, the reinforcement bulkheads 152 are separately made, and as shown in FIG. 8, the reinforcement bulkheads 152 are mounted on an inner surface of the intermediate floor upper panel 150 to serve to increase the bending and torsional stiffness of the intermediate floor upper panel 150.

Preferably, a plurality of band fastening holes 154 for fixing the battery are penetratingly formed at corner positions of the intermediate floor upper panel 150.

As described above, the rear cross reinforcement panel 140, the pair of extension reinforcement members 130, and the intermediate floor upper panel 150 serves as actual reinforcement structures for supporting the battery.

That is, if the battery is seated on the battery seating area of the intermediate floor panel 100, the battery weight is substantially supported by the rear cross reinforcement panel 140, the extension reinforcement member 130, and the intermediate floor upper panel 150.

Figure 5:
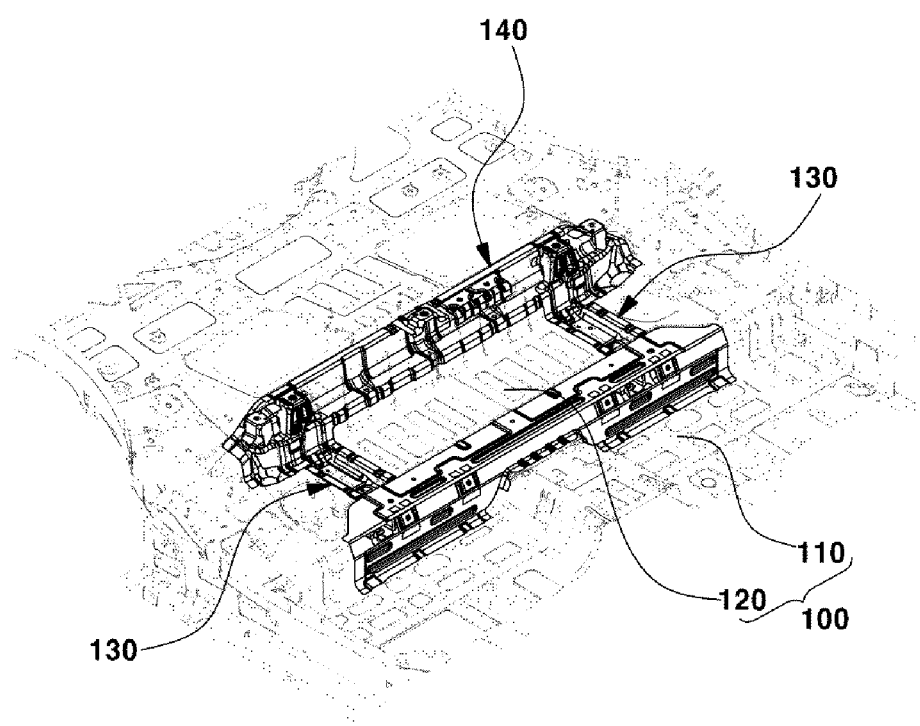
FIGS. 5 and 6 are perspective views illustrating an assembly of a body structure for supporting a battery of an eco-friendly vehicle according to the present disclosure.

With reference to FIG. 5, the rear cross reinforcement panel 140 and the pair of extension reinforcement members 130 support the second intermediate floor panel 120 of the intermediate floor panel 100 to form a Π-type arrangement, and the intermediate floor upper panel 150 is arranged to cover the step height portion between the first intermediate floor panel 110 and the second intermediate floor panel 120.

Figure 6:
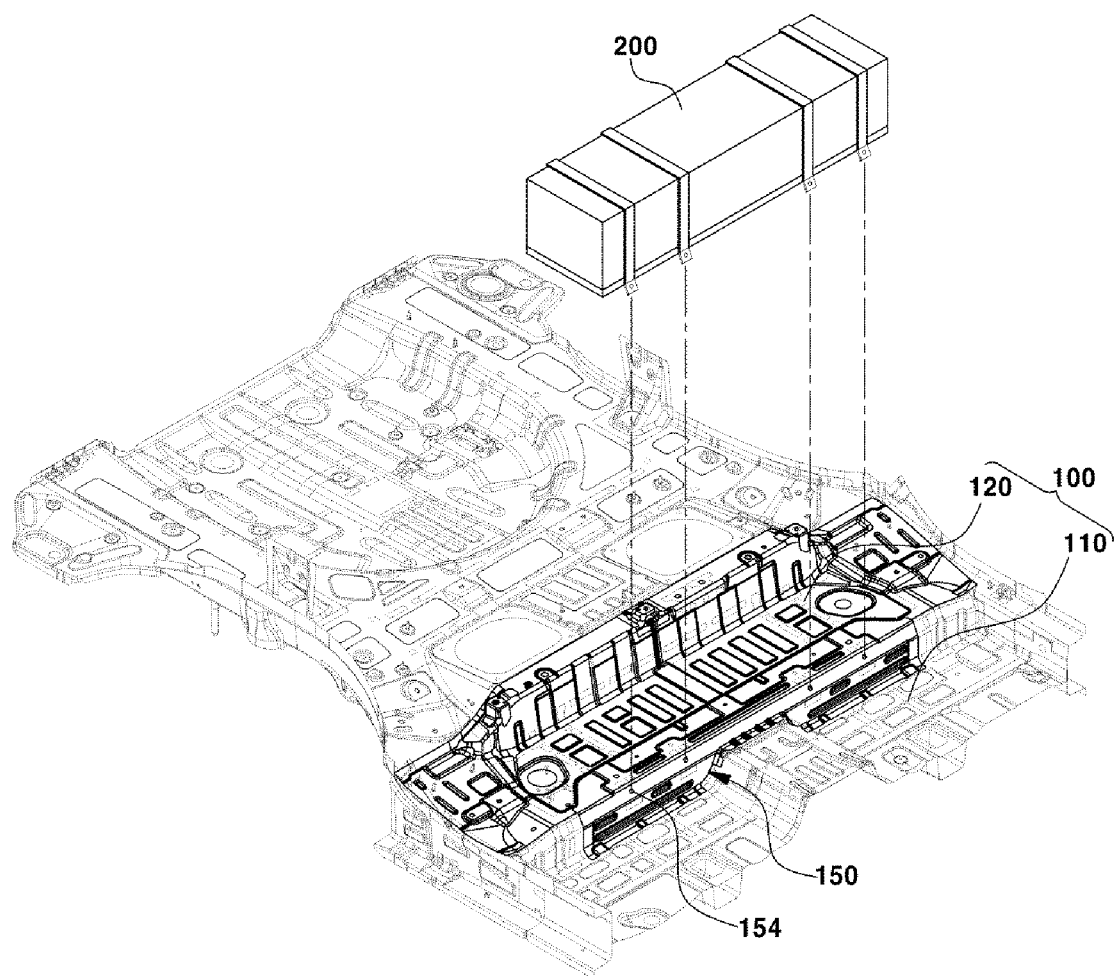

Of course, as shown in FIG. 6, if the second intermediate floor panel 120 is put on the rear cross reinforcement panel 140 and the extension reinforcement members 130, the rear cross reinforcement panel 140 and the extension reinforcement members 130, which are not shown as seen from the above, form the Π-type arrangement below the second intermediate floor panel 120, and the rear cross reinforcement panel 140 and the extension reinforcement members 130 serve to support and reinforce the second intermediate floor panel 100.

Figure 7:
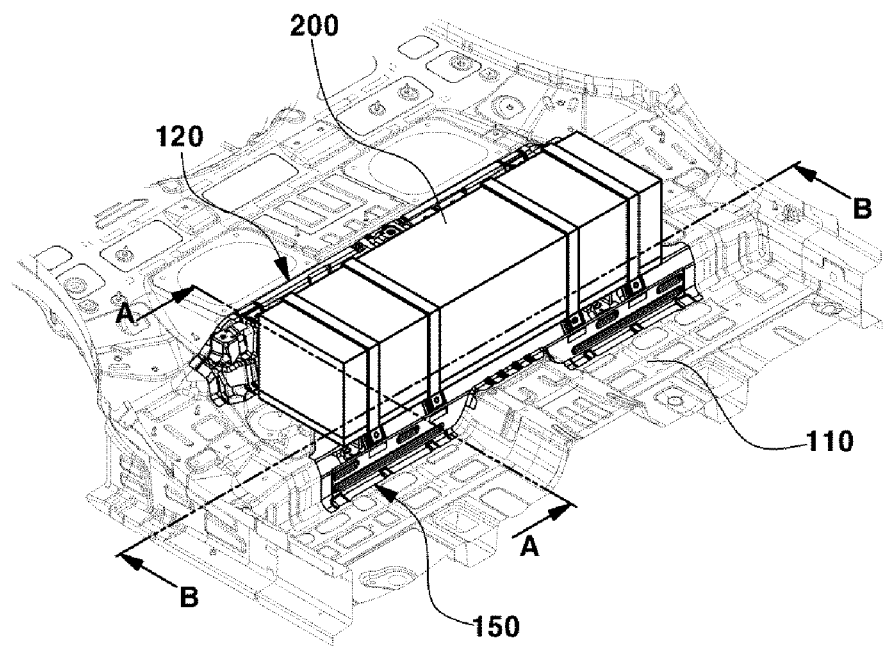
FIG. 7 is a perspective view illustrating a battery seated on a body structure for supporting the battery of an eco-friendly vehicle according to the present disclosure.

Accordingly, as shown in FIG. 7, if the battery 200 is mounted on the second intermediate floor panel 120 and the intermediate floor upper panel 150, the rear cross reinforcement panel 140 and the pair of extension reinforcement members 130, which form then-type arrangement below the battery 200, actually support the battery weight in addition to the intermediate floor upper panel 150.

With reference to FIG. 8, the intermediate floor upper panel 150 supports the bottom portion on the front side of the battery, and because the reinforcement bulkheads 152 as described above are mounted inside the intermediate floor upper panel 150, the intermediate floor upper panel 150 can easily support the battery without the occurrence of bending or torsion.

Figure 9:
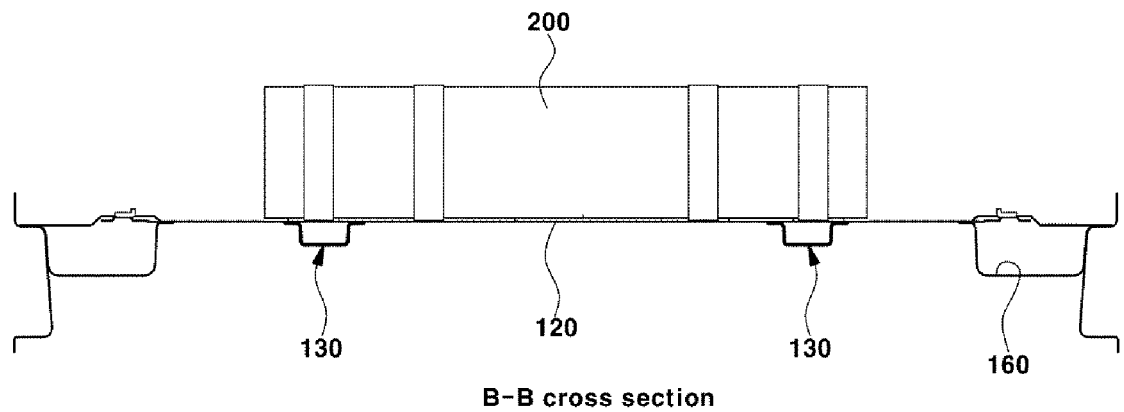

With reference to FIG. 9, the extension reinforcement members 130 support the bottom portion of the second intermediate floor panel 120, and thus, the extension reinforcement members 130 support the battery weight.

As a result, the rear cross reinforcement panel 140 and the extension reinforcement members 130 support the battery weight by supporting the bottom surface of the second intermediate floor panel 120 of the intermediate floor panel 100, and the intermediate floor upper panel 150 supports the battery weight by directly supporting the bottom portion on the front side of the battery.

Figure 2:
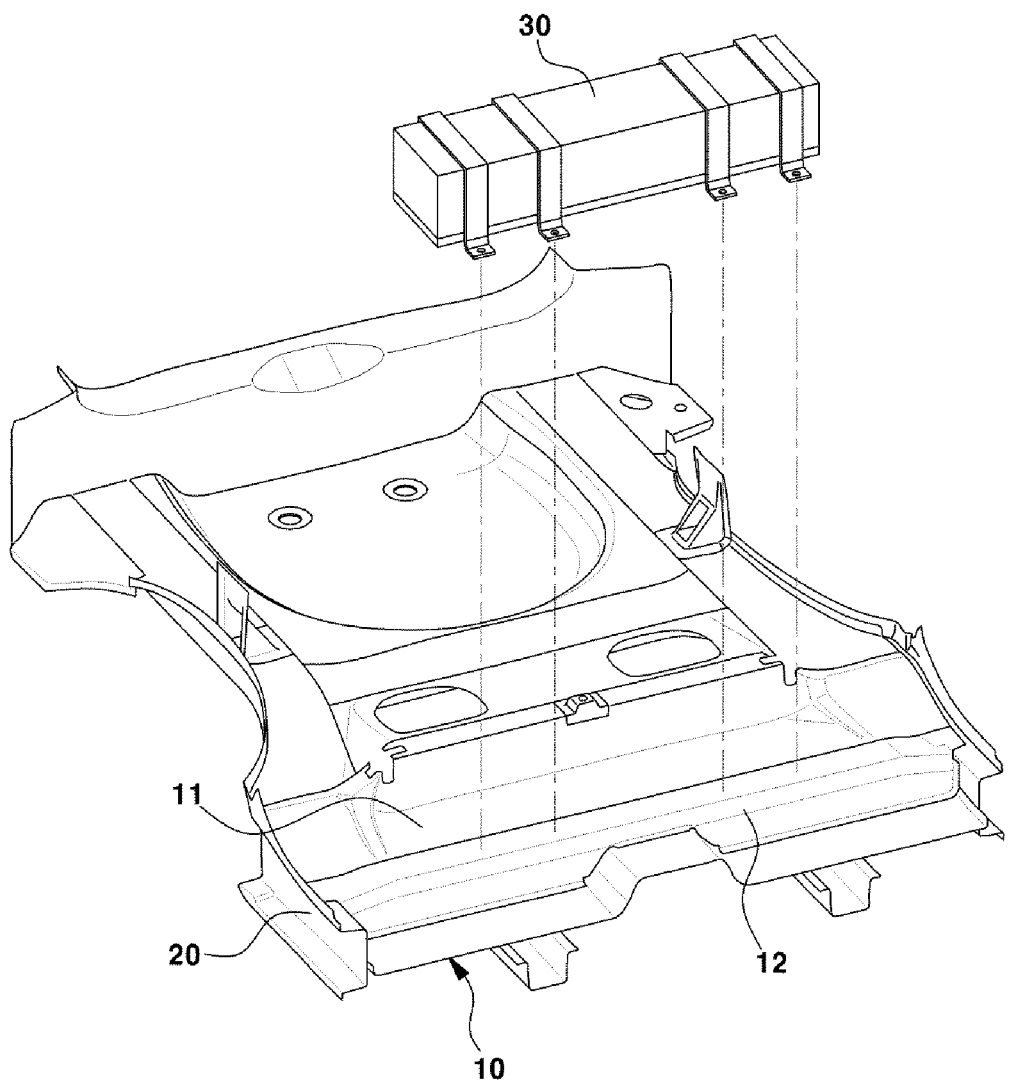
FIG. 2 is a perspective view illustrating an example in which a battery is mounted on first and second reinforcement panels attached to an intermediate floor panel in the related art.

As described above, because the rear cross reinforcement panel 110, the extension reinforcement members 130, and the intermediate floor upper panel 150 are all together mounted only on the regions, on which the battery is actually supported, of the intermediate floor panel 100 including the first intermediate floor panel 110 and the second intermediate floor panel 120, the size and weight of components for supporting the battery can be reduced in comparison with the existing reinforcement panel (first and second reinforcement panels 11 and 12 as described above with reference to FIGS. 1 and 2), and thus the light weight in comparison with the existing structure can be realized.

On the other hand, on both side portions of the intermediate floor panel 100, rear side members 160 are located as an integrated part of the vehicle body.

In this case, because the rear side member 160 is formed to have a structure of which an upper portion is opened as illustrated in FIG. 3, a waterproof sealer can be easily applied in the rear side member 160, and the watertight effect for blocking water permeation due to sealer application can be obtained.

In contrast, if the rear side member 160 is formed to have an open cross-sectional structure of which an upper portion is opened rather than a closed cross-sectional structure, side collision stiffness may be degraded.

To solve this, as illustrated in FIGS. 3 and 4, in the rear side member 160, a first side reinforcement member 170 that is divided into a horizontal plate and a vertical plate that is bent rearward from both end portions of the horizontal plate is mounted to keep vehicle side portion stiffness and to secure side collision stiffness.

On the other hand, although the stiffness reinforcement of the second intermediate floor panel 120 of the intermediate floor panel 100 is provided by the rear cross reinforcement panel 110 and the extension reinforcement members 130, and the stiffness reinforcement of the first intermediate floor panel 110 is provided by the intermediate floor upper panel 150, the side collision stiffness for the entire intermediate floor panel may be degraded.

Figure 10:
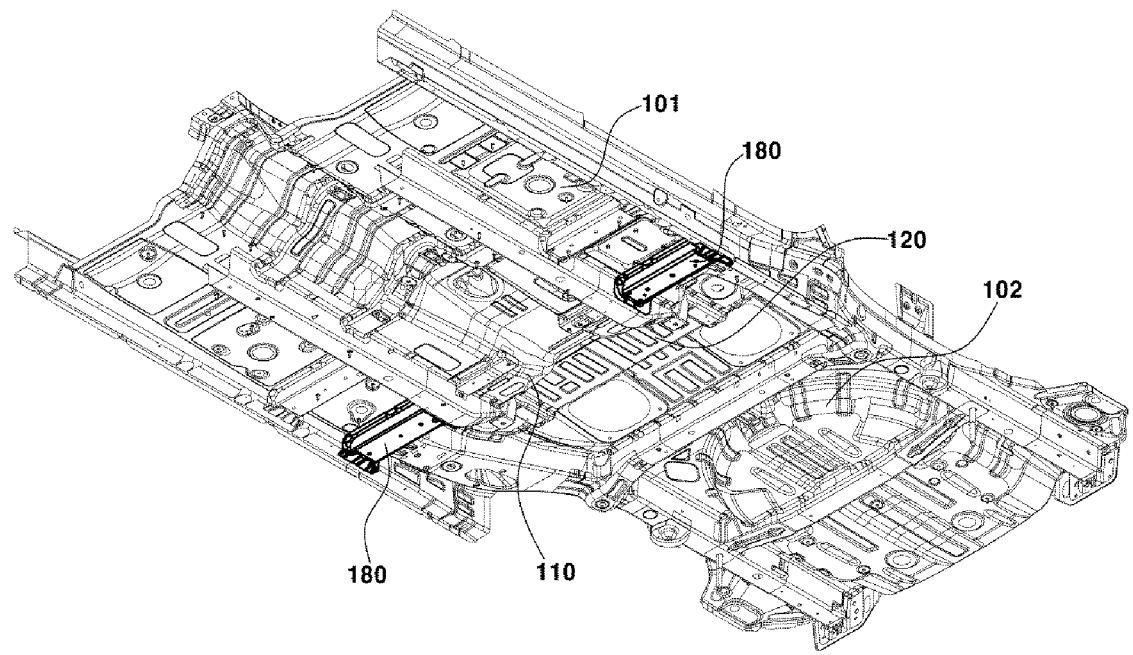
FIG. 10 is a bottom perspective view as seen from a lower side of a vehicle body to show a second side reinforcement member of a body structure for supporting a battery of an eco-friendly vehicle according to the present disclosure.

To solve this, as illustrated in FIG. 10, a pair of second side reinforcement members 180 are further mounted along a width direction of the vehicle body on portions on which the intermediate floor panel 100 is located.

That is, two or more second side reinforcement members 180 are further mounted to be spaced apart from each other along a width direction of the vehicle body at positions of the bottom portion of the first intermediate floor panel 110 of the intermediate floor panel 100 to reinforce the side collision stiffness.

More specifically, as shown in FIG. 10, the intermediate floor panel 100 is interposed between the center floor panel 101 and the rear floor panel 102, and the pair of second side reinforcement members 180 are further mounted along a width direction of the vehicle body at positions of the bottom portion of the first intermediate floor panel 110 of the intermediate floor panel 100 to reinforce the side collision stiffness for the intermediate floor panel.

As described above, due to the first side reinforcement member 170 and the second side reinforcement member 180, the side portion stiffness of the intermediate floor panel 100 and the rear side members 160 can be kept, and even the side collision stiffness can be easily secured.

The present disclosure has been described in detail with reference to preferred embodiments thereof. However, it will be appreciated by those skilled in the art that various changes and improvements may be made in these embodiments without departing from the principles and spirit of the present disclosure, the scope of which is defined in the appended claims and their equivalents.

What is claimed is:

1. A body structure for supporting a battery of an eco-friendly vehicle, comprising:
    an intermediate floor panel composed of a first intermediate floor panel connected to a center floor panel and a second intermediate floor panel connected to a rear floor panel;
    a rear cross reinforcement panel and an extension reinforcement member mounted on a bottom portion in a battery seating area of the intermediate floor panel; and
    an intermediate floor upper panel mounted on a front portion in the battery seating area of the intermediate floor panel.

2. The body structure of claim 1, wherein the rear cross reinforcement panel and the extension reinforcement member are arranged to support a bottom portion of the second intermediate floor panel.

3. The body structure of claim 1, wherein the rear cross reinforcement panel is arranged in a width direction of a vehicle body such that both end portions thereof are connected to rear side members of the vehicle body, and an upper portion thereof is bonded to a bottom portion on a rear side of the second intermediate floor panel.

4. The body structure of claim 1, wherein two or more extension reinforcement members are arranged in a width direction of a vehicle body and each of the two or more extension reinforcement members extends in a length direction of the vehicle body, such that rear end portions thereof are connected to the rear cross reinforcement panel and front end portions thereof extend to a bottom portion of the first intermediate floor panel.

5. The body structure of claim 1, wherein the intermediate floor upper panel has a vertically bent cross-sectional shape such that a vertical front end portion thereof is connected onto the first intermediate floor panel and a horizontal rear end portion thereof is connected onto the second intermediate floor panel.

6. The body structure of claim 5, further comprising a plurality of reinforcement bulkheads mounted on an inner wall of the intermediate floor upper panel.

7. The body structure of claim 5, wherein corner positions of the intermediate floor upper panel include a plurality of band fastening holes for fixing the battery.

8. The body structure of claim 1, wherein the battery is seated on the battery seating area of the intermediate floor panel such that a battery weight is supported by the rear cross reinforcement panel, the extension reinforcement member, and the intermediate floor upper panel.

9. The body structure of claim 8, wherein the rear cross reinforcement panel and the extension reinforcement member support the battery weight by supporting a bottom surface of the second intermediate floor panel of the intermediate floor panel, and the intermediate floor upper panel supports the battery weight by directly supporting a front bottom portion of the battery.

10. The body structure of claim 3, wherein an upper portion of the rear side member has an open structure for sealer application.

11. The body structure of claim 10, further comprising a first side reinforcement member mounted on an interior of the rear side member to keep side portion stiffness and to secure side collision stiffness.

12. The body structure of claim 1, further comprising two or more second side reinforcement members mounted to be spaced apart from each other along a width direction of a vehicle body for reinforcing side collision stiffness at positions of a bottom portion of the first intermediate floor panel of the intermediate floor panel.

* * * * *